United States Patent [19]

Kobayashi et al.

[11] Patent Number: 4,592,003
[45] Date of Patent: May 27, 1986

[54] MEASURING CIRCUIT DEVICE

[75] Inventors: Toshiyuki Kobayashi, Kyoto; Takao Ohta, Nagaokakyo; Masatsugu Miura; Hidetoshi Matsumoto, both of Kyoto, all of Japan

[73] Assignee: Omron Tateisi Electronics Co., Kyoto, Japan

[21] Appl. No.: 521,837

[22] Filed: Aug. 10, 1983

[30] Foreign Application Priority Data

Aug. 12, 1982 [JP] Japan .......................... 57-140563
Oct. 4, 1982 [JP] Japan .......................... 57-150963[U]
Dec. 27, 1982 [JP] Japan .......................... 57-234510

[51] Int. Cl.$^4$ .......................................... G01K 7/16
[52] U.S. Cl. .................................. 364/579; 340/715; 364/557
[58] Field of Search .............. 364/579, 557, 551, 552; 371/20, 29; 340/715

[56] References Cited

U.S. PATENT DOCUMENTS 3,665,169  5/1972  Henderson et al. ................. 364/579
3,866,171  2/1975  Loshbough .......................... 340/715
4,328,490  5/1982  Usuba et al. ........................ 340/715
4,402,055  8/1983  Lloyd et al. ........................ 364/579
4,443,117  4/1984  Muramoto et al. ................. 364/557
4,464,067  8/1984  Hanaoka ............................. 364/557

Primary Examiner—Errol A. Krass
Assistant Examiner—Heather R. Herndon
Attorney, Agent, or Firm—Stevens, Davis, Miller & Mosher

[57] ABSTRACT

A measuring circuit device comprising a measuring circuit, a display associated with the measuring circuit for displaying data generated by the measuring circuit, a display test circuit for testing the display, a performance test circuit associated with the measuring circuit for actuating the measuring circuit to display predetermined reference measured data by the display, a switch for initiating operation of the device, a switch circuit which upon actuation of the switch actuates the display test circuit and the performance test circuit, and which in a predetermined time period, initiates a measuring operation by the measuring circuit.

6 Claims, 12 Drawing Figures

MEASURING CIRCUIT DEVICE

BACKGROUND AND SUMMARY OF THE INVENTION

This invention relates to a measuring circuit device including a measuring circuit and a display associated with the circuit, and more particularly to an improved measuring circuit device provided with performance test means for notifying an operator whether or not the device is in a normal condition.

A measuring circuit device including a measuring circuit which measures an object and an associated display for displaying measured data is well known, wherein when a power switch is turned on the measuring circuit device immediately moves to a measuring ready mode without entering a self-performance testing mode so as to display measured data. The conventional measuring circuit device, however, has the disadvantage that if the measuring circuit is operating abnormally, it provides the display with incorrect measured data without notifying an operator that the displayed data is erroneous. The operator cannot know whether the data appearing on the display is correct or incorrect. As a result, the conventional measuring circuit device is disadvantageous with respect to its measuring reliability.

It is, therefore, a primary object of this invention to provide a measuring circuit device including testing and measuring modes, which performs a self-permance test in the testing mode so as to notify an operator operating the device whether or not the device is in a proper operating condition prior to the measuring mode.

It is a further object of this invention to provide a measuring circuit device including display testing means for testing the performance of a display and performance testing means for testing the performance of the device before measurements commence.

It is another object of this invention to provide a measuring circuit device which automatically performs a reference measurement so as to provide an improved precise measurement.

It is still another object of this invention to provide a measuring circuit device having a reduced power consumption.

According to this invention, there is provided a measuring circuit device comprising measuring circuit means, display means associated with the measuring circuit means for displaying data generated from the measuring circuit means, display test circuit means for testing the display by the display means, performance test circuit means associated with the measuring circuit means for actuating the measuring circuit means to display predetermined reference measured data by the display means, switching means for initiating operation of the device, switching circuit means responsive to actuation of the switching means for actuating the display test circuit means and the performance test circuit means, and for, in a predetermined time period, initiating a measuring operation by the measuring circuit means.

Other objects, features and the advantages of the measuring circuit device according to this invention will become apparent from the following detailed description of the invention provided in connection with the accompanying drawings, in which:

DETAILED DESCRIPTION

Figure 1:
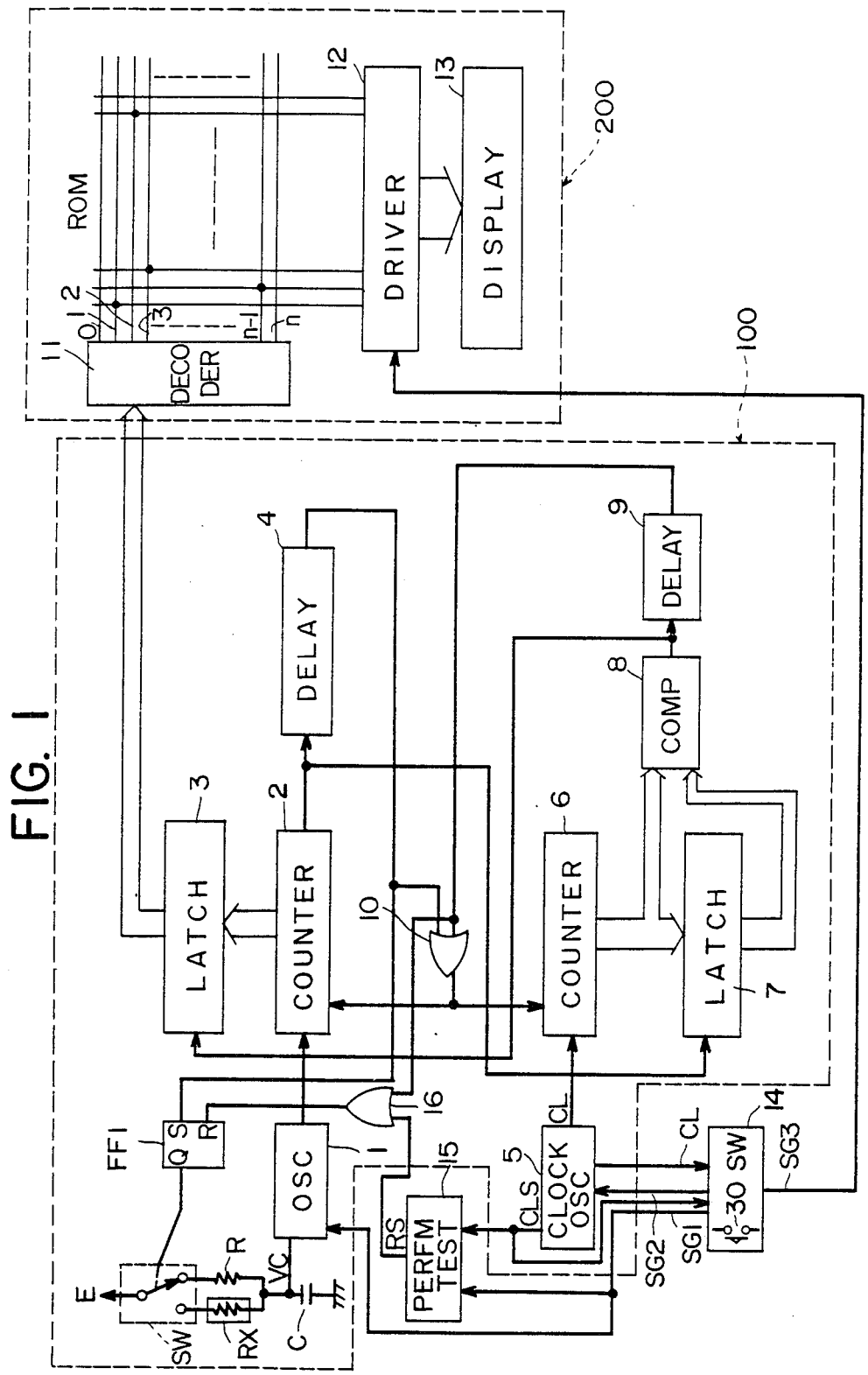
FIG. 1 is a block diagram of a measuring circuit device as a preferred embodiment of this invention.

Referring, now, to FIG. 1, there is shown a measuring circuit device including a measuring circuit section 100, a display section 200, a switching circuit 14, and a performance testing circuit 15, as a preferred embodiment of this invention. Though the device of this embodiment will be described hereinafter as a temperature measuring circuit device or an electronic thermometer for the convenience of explanation, it should be understood that this invention is not limited to a temperature measuring circuit device.

Figure 8:
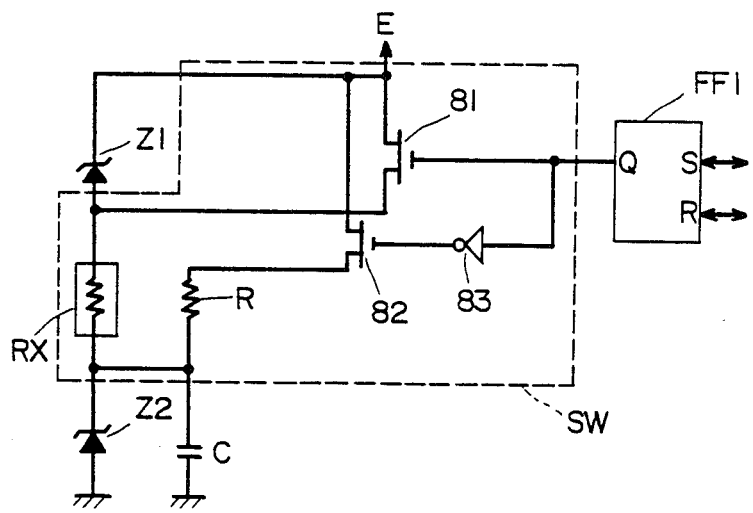
FIG. 8 is a circuit diagram of a switch switching between a sensor and a reference resistance employed in the device of FIG. 1.

In the measuring circuit 100, a thermistor or a temperature sensitive resistance $R_x$ as a sensor for measurement by this device is at one end thereof connected to a capacitor C together with one end of a reference resistance R. The respective opposite ends of resistances $R_x$ and R selectively are connected to a voltage source E through a switch SW. The other end of capacitor C is grounded. The resistance Rx is housed within a tip end of a measuring probe (not shown in drawings) of the electronic thermometer. The switch SW is actuated by an output signal from a flip-flop FF1, and so constructed that it is switched to the thermistor Rx in the presence of a Q-output from the flip-flop FF1 and to the reference resistance R in the absence of the Q-output. In FIG. 8, the switch SW is illustrated in detail. In the presence of the Q-output (low level) from the flip-flop FF1, a P-type MOS transistor 81 is rendered conductive and a P-type MOS transistor 82 remains nonconductive by an inverter 83, so that the source voltage E is applied to the thermistor Rx. In the absence of the Q-output from the flip-flop FF1 (high level at the Q terminal), the transistor 81 is turned off and the transistor 82 is turned on, so that the source E is applied to the reference resistance R. A pair of Zener diodes $Z_1$ and $Z_2$ are connected to discharge any high electrostatic potential which might be externally charged on the thermistor in use so as to protect all associated components of this device from being destroyed by the high potential. The reference resistance R is so designed to have the same resistance value as that of the thermistor Rx at a predetermined temperature, for example, 37.0 degrees centigrade (° C.).

The switching circuit 14 includes a push button switch 30 to initiate operation of the device of FIG. 1. Upon depression of the switch 30, the circuit 14 generates a start signal SG1 for application to an oscillator 1 as an oscillation start signal and to the performance testing circuit 15 as a performance test start signal, and a clock oscillation start signal SG2 for application to a clock oscillator 5. The circuit 14 further generates a display test signal SG3 for application to a display 13 through a driver 12 so as to energize all display segments, e.g. all LCD electrodes, on the display 13 during a first predetermined time period after the depression of the switch 30. The performance testing circuit 15 receives a clock signal CLS from the clock oscillator 5, and provides the flip-flop FF1 with a reset signal RS through an OR-circuit 16 for a second predetermined time period.

The oscillator 1 oscillates at a frequency defined by a time constant of the capacitor C and the thermistor Rx or the reference resistance R, and an output therefrom is applied to a counter 2. The counter 2 provides a latch circuit 3 with an output therefrom, and when it counts a predetermined count number $N_0$, it generates a reference output for application to a delay circuit 4 and a latch circuit 7. The clock oscillator 5 generates a clock signal CL at a predetermined frequency fc for application to a counter 6. An output from the counter 6 is applied to the latch circuit 7 and a comparator 8. The clock oscillator 5, the counter 6, the latch circuit and the comparator 8 constitute time count means for measuring a time period until the counter 2 generates the reference output. The latch circuit 7 stores a count value from counter 6 in response to the reference output from the counter 2 which acts as a strobe signal to the circuit 7. The output from the circuit 7 is applied to the comparator 8. When two output signals from the counter 6 and the circuit 7 coincide with each other, the comparator 8 generates a coincident signal for application to the latch circuit 3 as a strobe signal and to a delay circuit 9. An output from the delay circuit 4 is applied to the flip-flop FF1 as a set signal, and to the counters 2 and 6 through an OR-circuit 10 as a clear or reset signal. An output from the latch circuit 3 is applied to a decoder 11, and a decoded signal therefrom is applied to a read-only-memory ROM which is designed to store the respective temperature values corresponding to predetermined input signals. One of the stored values corresponding to the output from the circuit 3 is displayed by the display 13 through the driver 12.

Figure 2:
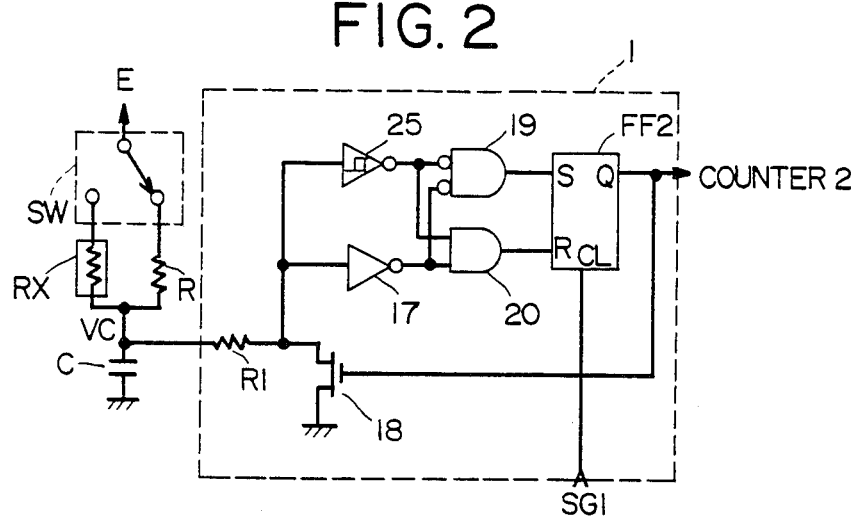
FIG. 2 is a circuit diagram of an oscillator employed in the device of FIG. 1.

In FIG. 2, the oscillator 1 is illustrated in detail. The capacitor C is connected through a discharging resistance Rl to inverters 17 and 25 and a N type MOS transistor 18. The inverter 17 is designed to have no hysteresis, but the invertor 25 is designed to have a hysteresis. Outputs from the inverters are applied through gate circuits 19 and 20 to set and reset input terminals S and R of a flip-flop FF2. A Q-output from the flip-flop FF2 is applied to the gate of the MOS transistor 18 and to the counter 2 as described above. The source of MOS transistor 18 is grounded. A terminal CL of the flip-flop FF2 is supplied with the oscillation start signal SG1 from the switching circuit 14.

Figure 3:
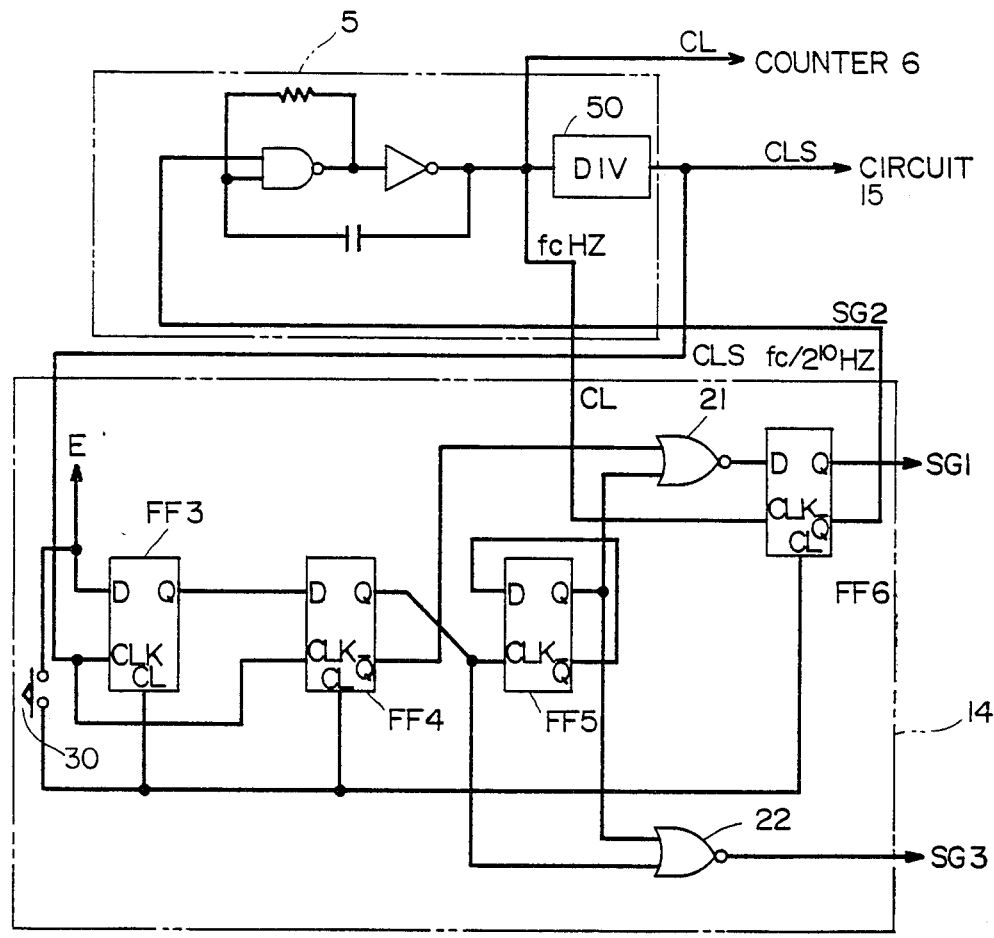
FIG. 3 is a circuit diagram of a clock oscillator and a switching circuit which are employed in the device of FIG. 1.

FIG. 3 shows a circuit diagram of the clock oscillator 5 and the switching circuit 14 which are employed in the device of FIG. 1. An input terminal D of a flip-flop 3 is supplied with voltage source E. To the respective terminals CLK of flip-flops FF3 and FF4 there is applied a clock signal CLS generated by the clock oscillator 5. The signal CLS is produced by a frequency divider 50 in the oscillator 5. A Q-output from the flip-flop FF3 is applied to an input terminal D of the flip-flop FF4. The flip-flop FF4 generates a Q-output for application to an input terminal CLK of a flip-flop FF5 and to a NOR circuit 22, and a $\overline{Q}$-output for application to a NOR circuit 21. An input terminal D of the flip-flop 5 is applied by a $\overline{Q}$-output therefrom. A Q-output from the flip-flop FF5 is applied to the NOR circuits 21 and 22. An output terminal of the NOR circuit 21 is connected to an input terminal D of a flip-flop FF6. To an input terminal CLK of the flip-flop FF6 there is applied the clock signal CL produced by the clock oscillator 5. An output from the push button switch 30 is wired to input terminals CL of the flip-flops 3, 4 and 6. A Q-output SG1 from the flip-flop FF6 is applied to the performance testing circuit 15 as the performance test start signal and to the oscillator 1 as the oscillation start signal. A $\overline{Q}$-output SG2 from the flip-flop FF6 is applied to the clock oscillator 5 as the oscillation start signal. The start signal SG1 applied to the circuit 15 and the oscillator 1 corresponds to the Q-output at "0" (Low), and the start signal SG2 applied to the oscillator 5 corresponds to the $\overline{Q}$-output at "1" (High). An output SG3 from the NOR circuit 22 is applied to the driver 12 as a display test signal, which corresponds to the output at "1" (High).

Figure 4:
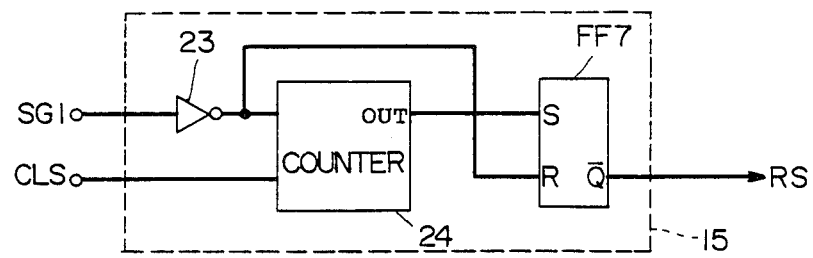
FIG. 4 is a circuit diagram of a performance test circuit employed in the device of FIG. 1.

FIG. 4 shows a block diagram of the performance test circuit 15. A counter 24 is supplied with the clock signal CLS from the clock oscillator 5, and with the performance test signal SG1 through an inverter 23, so that it counts for a predetermined time period. A count-up signal is generated from an output terminal OUT of the counter 24, and applied to a set input terminal S of a flip-flop FF7. The output from the inverter 23 is also applied to a reset input terminal R of the flip-flop FF7. An $\overline{Q}$-output RS from the flip-flop FF7 is applied to the input terminal R of the flip-flop FF1 through the OR circuit 16. The flip-flops FF1 and FF7 are so designed to have reset priority operations.

Figure 5:
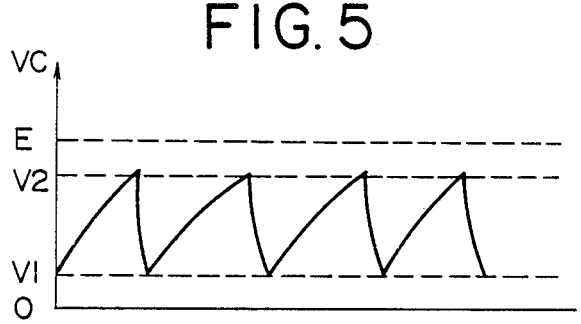
FIG. 5 is a graph illustrating a wave form of a voltage developed across a capacitor employed in the device of FIG. 1.

Operations of the measuring circuit device in this embodiment will be described hereinafter. FIG. 5 illustrates a wave form of a capacitor voltage Vc, viz. a voltage developed across the capacitor C (see FIG. 2). When the switch SW is turned to the reference resistance R, the capacitor C is charged through the resistance R and the capacitor voltage Vc will gradually increase. When the capacitor voltage Vc reaches an ON voltage $V_2$ of the inverter 25, the flip-flop FF2 is set and the MOS transistor 18 is rendered conductive, so that the capacitor C is discharged through the resistance $R_1$. When the voltage Vc decreases to an OFF voltage $V_1$, the flip-flop FF2 is reset and the capacitor C is again charged. A charging time $T_C$ for the capacitor is expressed by the following equation:

$$T_C = RC \ln(E-V_1)/(E-V_2) \qquad (1)$$

When $R_1 < R$, $R_1 < R_x$, a discharging time of the capacitor C may be negligible. Accordingly, the oscillation frequency $f_o$ of the oscillator 1 is expressed by the following equation:

$$f_0 = 1/T_c = 1/(K_1 RC) \quad (2)$$

where $K_1 = ln(E-V_1)/(E-V_2)$ is defined. The counters 2 and 6 are designed to be simultaneously reset at an initial stage of the measuring operations, and started to count output pulses from the oscillator 1 and the clock oscillator 5, respectively. When the counter 2 reaches the predetermined count value $N_0$, it generates the reference output for application to the latch circuit 7 so that a count value counted by the counter 6 at that moment is stored in the circuit 7. An elapsed time until the counter 2 generates the reference output is $N_0/f_0$. Accordingly, where the frequency of the clock oscillator 5 is $f_c$ (e.g. 33 KHz), the counted value of the counter 6 which is latched by the latch circuit 7 is expressed by the following equation:

$$(N_0/f_0)/(1/f_c) = f_c N_0/f_0 \quad (3)$$

The reference output from the counter 2 is delayed by the delay circuit 4 for a short time, and is then applied to the OR circuit 10 so as to reset the counters 2 and 6 and to the flip-flop FF1 which is thus set. As the flip-flop FF1 is set, it generates the Q-output therefrom and the switch SW is switched to the thermistor $R_x$ from the reference resistance R. A frequency $F_x$ produced by the oscillator 1 where the thermistor $R_x$ is connected to the source E is given by the following equation:

$$f_x = 1/(K_2 R_x C) \quad (2')$$

where the equation (2') is made from the above-mentioned equation (2) by replacing R with $R_x$, and $K_2$ represents $ln\ (E-V_1)/(E-V_2)$. Then, the counter 2 starts to count output pulses having the frequency $f_x$ from the oscillator 1, and simultaneously the counter 6 again starts to count a clock signal generated in the clock oscillator 5. The clock signal is assumed to have a frequency $f_c'$. When the counter 6 reaches the counted value expressed by the above-mentioned equation (3), the comparator 8 generates a coincident signal of the counted value in the counter 6 and the counted value formerly stored in the latch circuit 7 so as to store a value counted by the counter 2 in the latch circuit 3. Assuming that the counted value stored in the circuit 3 is $N_x$, the counted value $f_c'\ N_x/f_x$ counted by the counter 6 within a time period $N_x/f_x$ until the counter 2 counts up to Nx is equal to a counted value $f_c N_0/f_0$ (the equation (3)) stored in the latch circuit 7. Therefore, the following equation can be formed:

$$f_c' N_x/f_x = f_c N_0/f_0 \quad (4)$$

Assuming that the clock signal frequency from the oscillator 5 has not changed when switching between the resistances R and $R_x$, $f_c$ becomes equal to $f_c'$, and the equation (4) is developed to the following equation in view of the equations (2) and (2'):

$$N_x = f_x N_0/f_0 = K_1 \cdot R \cdot N_0/(K_2 \cdot R_x) \quad (5)$$

The resistance value of the thermistor $R_x$ is expressed by the following equation:

$$R_x = R_0 \exp B(1/T - 1/T_0) \quad (6)$$

where $R_0$ is a resistance value of the $R_x$ at absolute zero degrees $T_0$, B is a Bortzmar constant, and T is an absolute temperature.

As illustrated in FIG. 8, the switch SW is contructed with semiconductors, but if the resistance values of the reference resistance R and the thermistor Rx are nearly equal each other, the ON resistance of the switch SW, the OFF voltage $V_1$ and the ON voltage $V_2$ may be regarded as not changing in the respective switching positions of the switch SW, so that an equation $K_1 = K_2$ is made. Accordingly, when the equation (6) is applied to the equation (5), the following equation can be derived:

$$N_x = N_0 \cdot (R/R_0) \cdot \exp B(1/T_0 - 1/T) \quad (5')$$

which can be rewritten as $$T = 1/[1/T_0 - 1/B \cdot ln(N_x R_0)/(N_0 R)] \quad (7)$$

Therefore, if Nx is fixed, the temperature T of the equation (7) is fixed since the remaining parameters are fixed constant values. The read-only-memory ROM stores converting codes in accordance with the equation (7). The data Nx stored in the latch circuit 3 is applied to the read-only-memory ROM through the decoder 11, so that temperature data is read from the read-only-memory ROM to be displayed by the display 13 through the driver 12.

Figure 6:
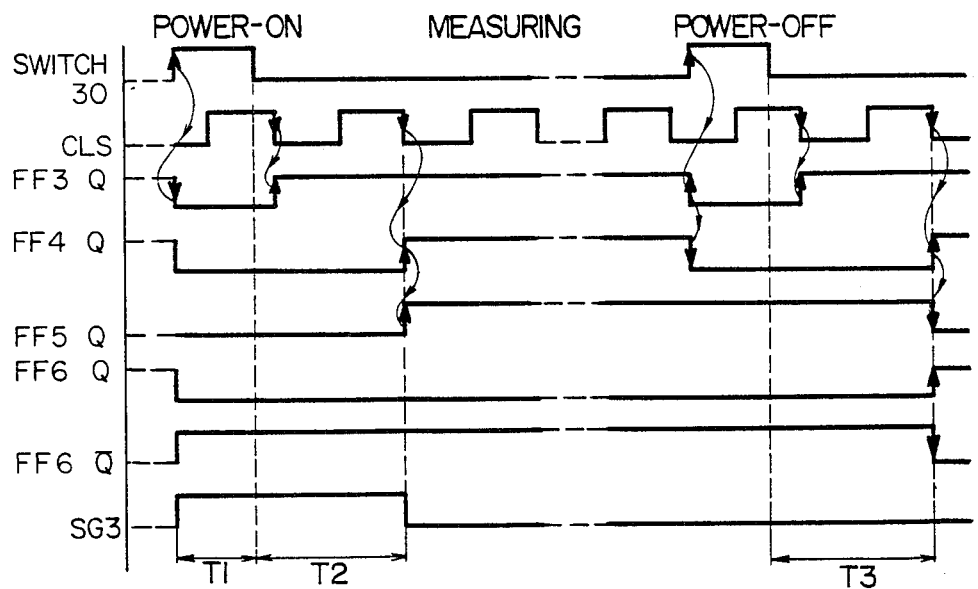
FIG. 6 is a time-chart illustrating operations of the switching circuit of FIG. 3.
Figure 7:
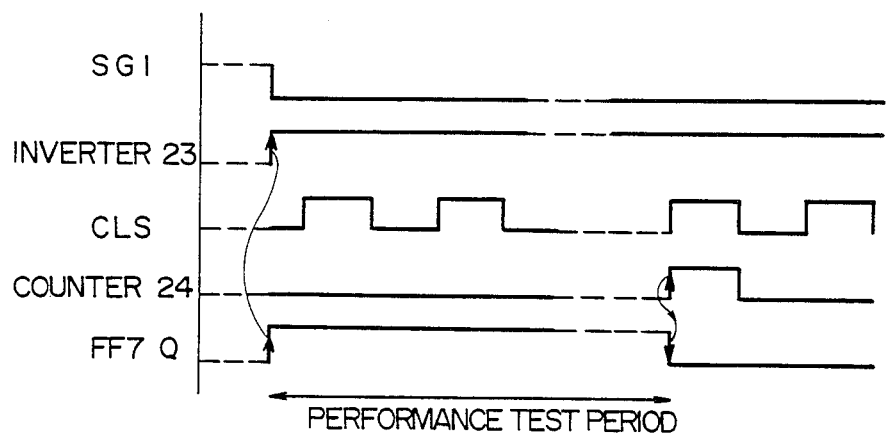
FIG. 7 is a time-chart illustrating operations of the performance test circuit of FIG. 4.

Referring to FIGS. 6 and 7, the self-performance testing operations of the device of FIG. 1 will be described hereinafter. FIGS. 6 and 7 shows time charts of the switching circuit 14 and the performance test circuit 15. Upon depression of the push button switch 30 in the circuit, a rising signal generated by the switch 30 resets the flip-flops FF3, FF4 and FF6. Immediately after the resetting, the flip-flop FF6 generates the Q-output SG1 actuating the circuit 15 and the oscillator 1, and the $\overline{Q}$-output SG2 actuating the clock oscillator 5. Simultaneously, the NOR circuit 22 generates the display test signal SG3. In other words, upon the depression of the switch 30, the operations of this device enters into a power-ON status. The display test signal SG3 remains to be generated during a summed time period of an ON time $T_1$ of the switch 30 and a chattering preventing time $T_2$ as illustrated in FIG. 6. The flip-flops FF3 and FF4 are arranged to prevent this device from being erroneously operated by chattering of contacts of the switch 30 and provide the time $T_2$ which is in the order of $2^{10}/f_c$ seconds. Accordingly, $T_1$ becomes much greater than $T_2$, and the display test signal SG3 substantially remains to be generated during the time when the switch 30 is turned on or depressed. When the signal SG3 is applied to the driver 12, all display segments of the display are excited or lit, so that an operator can confirm if the display 13 is functioning normally by watching to see that all display segments are lit. In the time $T_2$ after the switch 30 is turned off, the flip-flops FF4 and FF5 are set in response to a decay signal of the clock signal CLS, and the NOR circuit 22 is turned to stop the generation of the display test signal SG3.

During the generation of the signal SG3, the performance test circuit 15 receives by the performance test start signal SG1 through the inverter 23 and the clock signal CLS, so that the counter 24 starts to count. Simultaneously, a reset signal is applied to the flip-flop FF7 so as to generate a Q-output "1" from the flip-flop FF7. The $\overline{Q}$-output is applied to the reset input terminal R of the flip-flop FF1 through the OR circuit 16 so as to reset the flip-flop FF1. Therefore, the switch SW is not switched to the resistance Rx, and remains connected to the resistance R. The oscillator 1 oscillates based on the reference resistance R which is selected to have the same resistance value as that of the thermistor R4 at 37.0° C., so that until the counter 24 counts up to a predetermined number of counts, the display 13 continues to display the reference measured value 37.0° C. Thus, the operator can confirm the performance of the device by watching whether or not the temperature 37.0° C. is displayed on the display 13. This performance test occurs during the generation of the display test signal SG3, viz. during the depression of the switch 30. The confirmation of the display about 37.0° C., however, is available only after releasing the depression of the switch 30 because during the time period $T_1 + T_2$ all of the display segments of the display 13 are excited.

When the counter 24 counts up to the predetermined number of counts, it provides the flip-flop FF7 with a count-up signal so as to set the same. Then, the flip-flop FF7 stops the generation of the reset signal RS for application to the flip-flop FF1, and the above-mentioned measuring operations based on the thermistor Rx are initiated. A measured temperature will then be displayed on the display 13.

When the push button switch 30 is depressed after completion of the measuring operation, a rising signal of the switch 30 resets the flip-flops FF3 and FF4. In a time period $T_3$ which is provided for avoiding any contact chattering after releasing the depression to the switch 30, a decay signal of the clock signal CLS sets the flip-flop FF4 and resets the flip-flop FF5. Then, the Q-output of the flip-flop FF6 becomes "1", while the Q̄-output becomes "0", so that all operations move to a power-off status. That is, by turning the outputs of the flip-flop FF6 the oscillator 1 and the clock oscillator 5 stop their oscillation.

Thus, the switching circuit 14 having a simplified circuit construction including a simple push button switch 30 constitutes a switch input section which can stably switch the operation of this device between the measuring and the non-measuring positions. In the switch input section, the flip-flop FF5 is switched in response to the switching operations, and performs a binary operation. The output of the flip-flop FF5 is retained by the voltage source E through the flip-flops FF3 and FF4. In accordance with the output of the NOR circuit 21 which is a logic product of the output from the flip-flop FF5 and the signal from the switch 30, the flip-flop FF6 provides the clock oscillator 5 with the oscillation start signal for controlling the actuation and the stop of the oscillation. Thus, in the non-measuring stage, the generation of the clock oscillator ceases, so that little power is consumed by this device. Moreover, the electronic circuit components of this device may be of the CMOS type, so that the power consumption of this embodiment may be reduced. Since this device does not need any analogue switch which generally requires a relatively large space in IC patterns, this device is easily designed using IC components which are reduced in scale.

Figure 9:
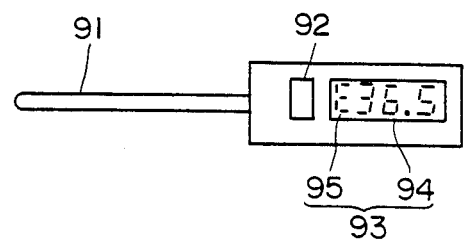
FIG. 9 is a front view illustrating a measuring circuit device as a modification of the device of FIG. 1.
Figure 10:
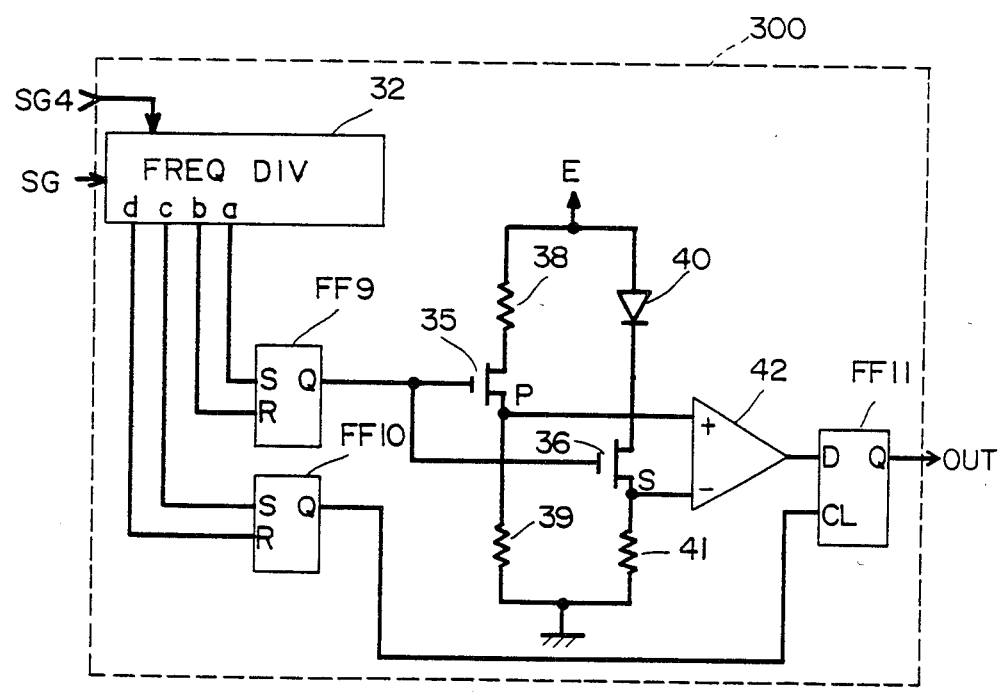
FIG. 10 is a circuit diagram of a voltage testing circuit employed in the device of FIG. 9.
Figure 11:
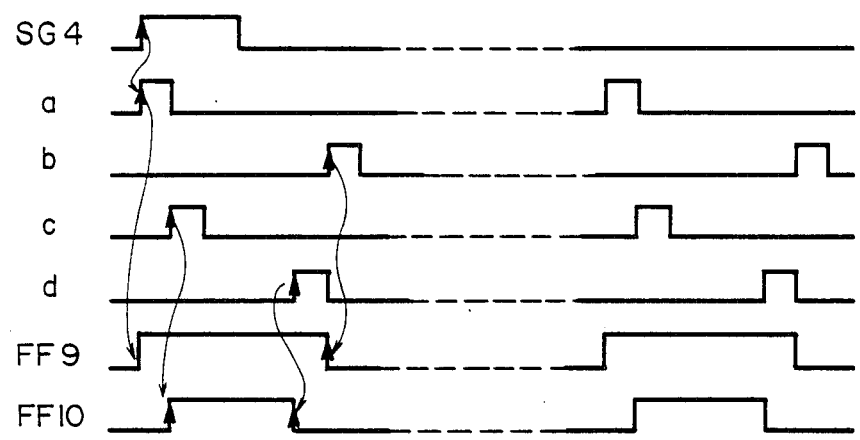
FIG. 11 is a time chart illustrating the operations of the circuit of FIG. 10.
Figure 12:
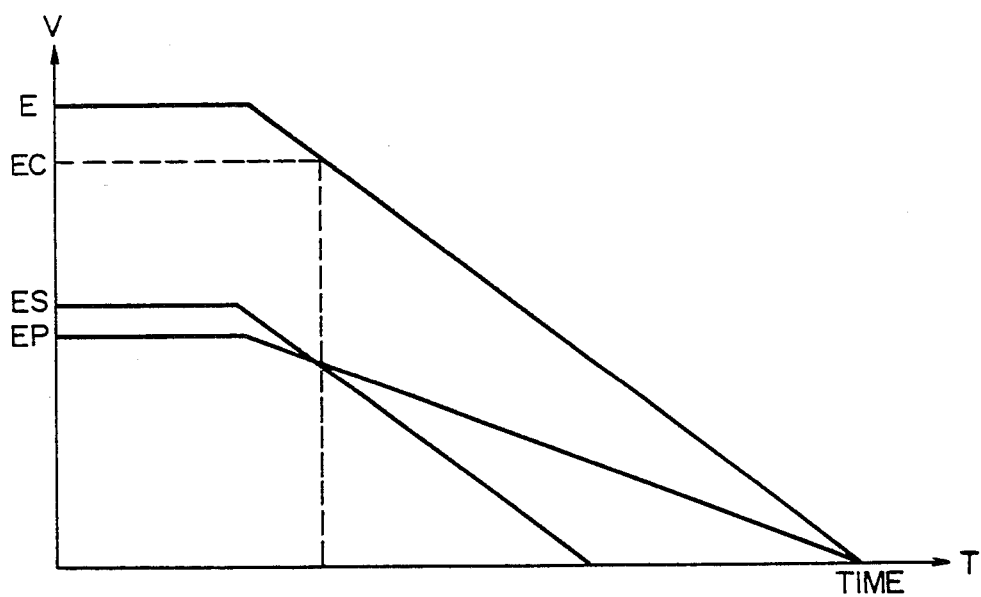
FIG. 12 is a graph illustrating wave forms of voltages developed in the circuit of FIG. 10.

Referring to FIGS. 9 and 10 there is shown a modification of the measuring circuit device of FIG. 1 which is a portable thermometer. FIG. 9 shows the thermometer which includes a seasing portion or probe 91, a start switch 92 and a display 93. The display 93 includes a temperature display section 94 and a source voltage indication section 95. The device in this modified embodiment includes the measuring circuit device of FIG. 1 and further includes a source voltage check circuit 300 as illustrated in FIG. 10. The sensing portion 91 at its tip portion houses the thermometer Rx therewithin, the start switch 92 represents the push button switch 30 of FIG. 3, and the display 93 corresponds to the display 13 of FIG. 1. In FIG. 10, a frequency divider 32 receives start signal SG4 generated from the switch 92 or 30 and by a clock signal SG from the clock oscillator 5, and is connected to flip-flops FF9 and FF10. A Q-output of the flip-flop FF9 is applied to analogue switches 35 and 36. A Q-output, viz. latch signal, of the flip-flop FF10 is applied to a terminal C2 of a flip-flop FF11. A source voltage E is connected to a battery to be checked by the circuit 300. A Q-output of the flip-flop FF11 is applied to the display 13 or 93 through the decoder 12 to energize the display segment 95. FIG. 11 is a time chart illustrating wave forms appearing at the respective locations indicated for FIG. 10. FIG. 12 illustrates voltage wave forms Ep and Es at points P and S of FIG. 10 developed along a decaying voltage curve of the source voltage E or battery according to time elapsed. As the source voltage E drops, the voltage Ep at the point P where the respective resistances 38 and 39 are equal to each other with respect to resistance values declines at a half angle of the declining angle of the voltage E. The voltage Es at the point S declines at the same angle as that of the declining voltage E since the voltage across diode 40 is constant. When the curves Ep and Es cross each other, viz. the source voltage E drops to a voltage Ec, a comparator 42 generates a coincident signal for application to the latch circuit FF11. Then, the coincident signal is held by the latch signal from the flip-flop 10, so that the display segment 95 is driven by the driver 12 and the E mark 95 starts flashing. The minimum value Ec of the source voltage E which ensures normal operations of this device is determined by selecting values of the resistances 38 and 39. Thus, the operator can notice a drop of battery (E) potential below the minimum value Ec by noticing the flashing segment 95 after the depression of the switch 92 or 30.

The measuring circuit device in the above-mentioned embodiments is designed to measure temperature, particulary body temperature, but may be designed to measure other physical matters, pressure, humidity, sound and so forth. The sensor of this measuring circuit device is not limited to the thermistor, but may be replaced by any other sensor, such as capacitive type sensor and so forth.

Thus, according to this invention, there is provided a measuring circuit device in which in addition to a normal measuring operation, a pre-operation test or a self-performance test is carried out prior to the measuring operation in order to confirm the perfect performance of the measuring circuit and the display.

It should be understood that the above description is merely illustrative of this invention and that many changes and modifications may be made by those skilled in the art without departing from the scope of the appended claims.

What is claimed is:
1. A measuring circuit device comprising:
  measuring circuit means,
  display means for displaying data generated from the measuring circuit means, display test circuit means for testing said display means and providing a visual display by said display means of said test, performance test circuit means for actuating said measuring circuit means to display predetermined reference measured data by said display means, switching means for initiating operation of said device, and switching circuit means responsive to actuation of said switching means for actuating said display test circuit means and said performance test circuit means, and for initiating a measuring operation by said measuring circuit means after said display test circuit means tests said display means and said performance test circuit actuates said measuring circuit means to display said predetermined reference data.

2. A measuring circuit device according to claim 1, in which said measuring circuit means comprises a sensor for sensing a parameter to be measured, a reference component, a variable frequency oscillator having an input to which one of said sensor and reference component can be connected to determine the oscillating frequency, means for switchably connecting one of a sensor and a reference component to the oscillator input, comparing means for comparing a frequency produced by said oscillator when said sensor is connected thereto with a frequency produced when said reference component is connected thereto, and means responsive to an output of said comparator for forming a signal representative of a measured parameter, said display means displaying said signal representative of a measured parameter.

3. A measuring circuit device according to claim 1, wherein said measuring circuit device is a thermometer.

4. A measuring circuit device according to claim 1 further comprising voltage testing means for checking if a voltage source is normal, said voltage testing means causing said display means to indicate whether said voltage source is normal or not.

5. A measuring circuit device according to claim 1, wherein said measuring circuit means includes a sensor for sensing a parameter associated with an object to be measured by the device and a diode so coupled to the sensor that said diode discharges electrostatic potential externally charged on the sensor.

6. A measuring circuit device, comprising:

a sensor for sensing a parameter to be measured;

a reference component;

measuring circuit means comprising a variable frequency oscillator having an input to which one of said sensor and reference component can be connected to determine the oscillating frequency, means for switchable connecting one of said sensor and said reference component to said oscillator input;

comparing means for comparing a frequency produced by said oscillator when said sensor is connected thereto, with a frequency produced when said reference component is connected thereto, means responsive to an output of said comparator for producing a count value representative of a measured parameter, means including a storage means for producing a displayable parameter value from said count value; and display means for displaying said displayable parameter value.

* * * * *